United States Patent
Uesugi et al.

(10) Patent No.: US 6,424,618 B1
(45) Date of Patent: Jul. 23, 2002

(54) CODE GENERATING METHOD AND CODE SELECTING METHOD

(75) Inventors: Mitsuru Uesugi, Yokohama; Taku Nagase, Machida; Osamu Kato, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/091,422

(22) PCT Filed: Nov. 6, 1997

(86) PCT No.: PCT/JP97/04035

§ 371 (c)(1),
(2), (4) Date: Jun. 24, 1998

(87) PCT Pub. No.: WO98/20639

PCT Pub. Date: May 14, 1998

(30) Foreign Application Priority Data

Nov. 7, 1996 (JP) .............................................. 8-309949

(51) Int. Cl.[7] .............................................. H04J 13/00
(52) U.S. Cl. ...................................... 370/208; 370/342
(58) Field of Search ............................... 370/208, 209, 370/335, 342, 441, 479; 375/142, 149, 150, 140

(56) References Cited

U.S. PATENT DOCUMENTS

| 4,471,342 A | | 9/1984 | Gutleber | |
|---|---|---|---|---|
| 5,103,459 A | * | 4/1992 | Gilhousen et al. | 370/209 |
| 5,111,416 A | | 5/1992 | Harada | |
| 5,734,647 A | * | 3/1998 | Yoshida et al. | 370/335 |
| 5,896,368 A | * | 4/1999 | Dahlman et al. | 370/335 |
| 6,041,034 A | * | 3/2000 | Fukumasa et al. | 370/203 |

FOREIGN PATENT DOCUMENTS

| EP | 0814581 | 12/1997 |
|---|---|---|
| JP | 6-501349 | 2/1994 |
| JP | 8-95954 | 4/1996 |
| WO | 92/00639 | 1/1992 |
| WO | 95/23459 | 8/1995 |

OTHER PUBLICATIONS

Mo–Han Fong et al., "Concatenated Orthogonal/PN Spreading Scheme for Cellular DS–CDMA Systems with Integrated Traffic" Communications–Gateway to Globalization; Proceedings of the Conference on Communications, Seattle, Jun. 18–22, 1995 Institute of Electrical and Electronic Enginners, vol. 2, pp. 905–909, Jun. 18, 1995.
English Language Abstract of JP No. 8–095954.

* cited by examiner

Primary Examiner—Kwang Bin Yao
(74) Attorney, Agent, or Firm—Greenblum & Bernstein, P.L.C.

(57) ABSTRACT

The present invention relates to a code generating method for combining an orthogonal code for CDMA having a specific spreading factor and its polarity inverted spreading code to generate another spreading code having a larger spreading factor than that of the spreading code. And the present invention relates to a code selecting method for combining an orthogonal code for CDMA having a specific spreading factor and its polarity inverted spreading code to generate another spreading code having a larger spreading factor than that of the spreading code, then to assign the generated orthogonal code for a user in order of users having an orthogonal code of small spreading factor.

14 Claims, 6 Drawing Sheets

FIG. 2

| | |
|---|---|
| W1 | 0110100110010110 |
| W2 | 1100001100111100 |
| W3 | 1010010101011010 |
| W4 | 0000111111110000 |
| W5 | 1001100101100110 |
| W6 | 0011001111001100 |
| W7 | 1010101001010101 |
| W8 | 1111111100000000 |
| W9 | 1001011010010110 |
| W10 | 0011110000111100 |
| W11 | 0101101001011010 |
| W12 | 1111000011110000 |
| W13 | 0110011001100110 |
| W14 | 1100110011001100 |
| W15 | 0101010101010101 |
| W16 | 0000000000000000 |

FIG. 7
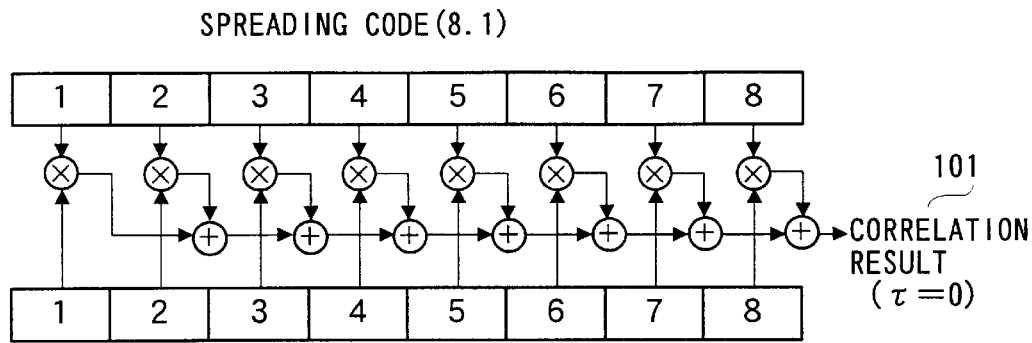
(a)
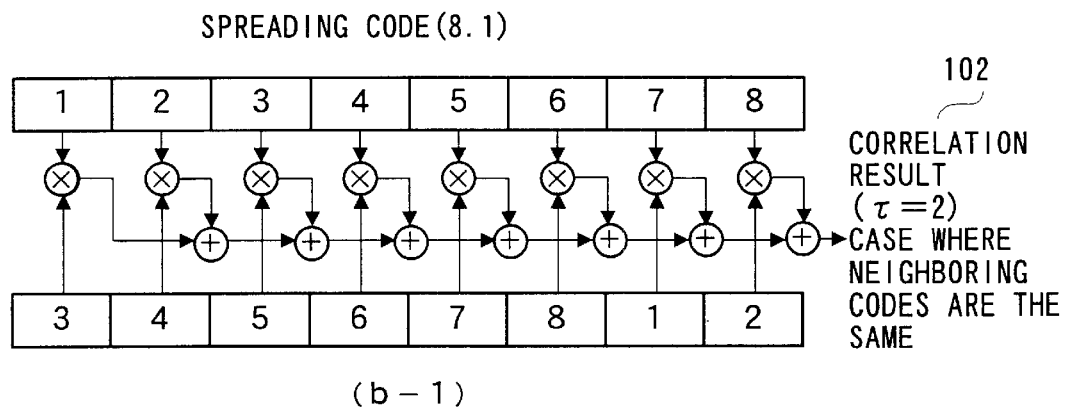
(b-1)
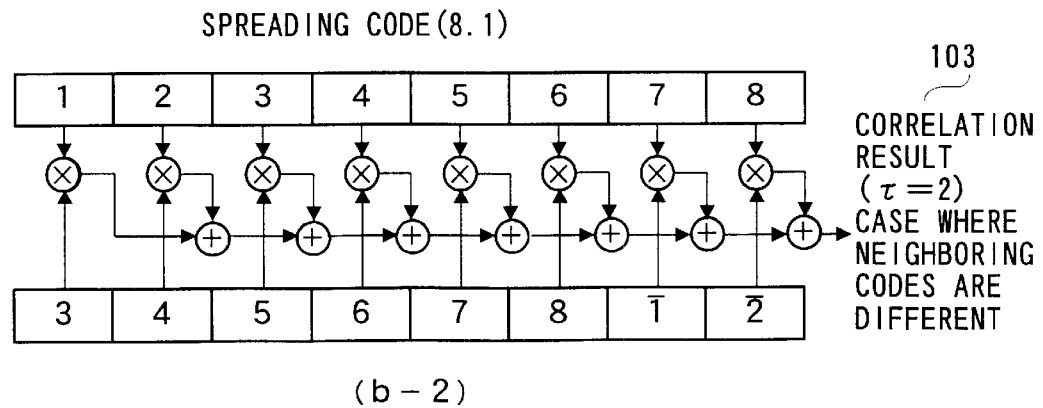
(b-2)

CODE GENERATING METHOD AND CODE SELECTING METHOD

TECHNICAL FIELD

The present invention relates to a method for generating a spreading code used in a CDMA (Code Division Multiple Access) and a method for selecting a spreading code having the small time dependence from the generated codes, more preferably a method for generating and selecting orthogonal codes of different spreading factors.

BACKGROUND ART

In a CDMA system, information signals are spread using inherent spreading codes assigned for all users, which identify each one of them. That enables signals of a plurality of users to be multiplied in the same frequency band, which results in a large efficient use of a frequency. In a CDMA system, if spreading codes absolutely orthogonalize, no interference occurs between signals of each user. That allows the number of users corresponding to the number of orthogonal codes to be accommodated under the ideal propagation condition, which ensures no quality deterioration in communications And, in a CDMA system, in the case of multiplying spreading signals using spreading codes having different spreading factors, it is possible to multiply user signals having different rates in the same frequency band because the division of signals is possible when different spreading codes are used. Especially, using Walsh codes as a spreading code makes such communication possible because Walsh codes having different spreading factors are orthogonalized to each other.

FIG.1 illustrates a case of transmitting information signals from user #1 to user #7 using spreading codes having different spreading factors. User #1, #2 and #3 use a spreading code of spreading factor 8, user #4 and user #5 use a spreading code of spreading factor 16, and user #6 and user #7 use spreading code of factor 32. Each number from 1 to 7 in FIG. 1 respectively illustrates transmission signals of each of user #1 to user #7.

As illustrated in FIG. 1, when a spreading factor of a spreading code becomes a second, i.e. spreading factor 16 becomes 8, the time for one symbol becomes shorter. That makes a symbol rate twice, which results in twice of information capacity. However with respect to other users, it is impossible to transmit signals using a spreading code of spreading factor 8 and its two-combined spreading code of spreading factor 16. Because of it, the total information capacity that can be transmitted is not improved in the whole by making spreading factor of a spreading code one second.

FIG.2 illustrates examples of Walsh code. In this example, a length of spreading code is 16, which means the presence of 16 codes orthogonalized to each other. These codes are referred to W1 to W16.

For instance, when 0000 is used as a spreading code of spreading factor 4, this spreading code does not orthogonalizes with W4, W8, W12 and W16. It means that a user in using this spreading factor 4 consumes four codes of spreading factor 16 for four users. On the other hand, the transmission information capacity becomes 4 times that of the case of using a spreading code of spreading factor 16, which provides no change to the total amount of transmission information in the system. Namely, the total transmission information capacity (spreading factor×transmission information capacity) is constant when Walsh codes are used even by combining any spreading factors.

However, since the time dependence of Walsh code is large, its performance deteriorates drastically by delayed waves. To prevent it, a method to use Walsh codes with long codes an others are tried, however in this case a problem in acquiring synchronization is still remained.

On the other hand, the time dependence of orthogonal Gold code well known as an orthogonal code is smaller than that of Walsh code. Accordingly, the deterioration rate in its performance caused by delayed waves is smaller than that of Walsh code. However, in orthogonal Gold codes, while those of the same spreading factor orthogonalize, those of different spreading factors necessarily orthogonalize. Because of it, interference between user signals occurs, which results in deterioration in quality and decreases of transmission capacity.

And, in the case of using codes having large time dependence, interference between codes caused by delayed waves becomes large, which may bring deterioration in quality. The more the transmission power is increased to compensate it, the more interference to other users is increased. That results in deterioration in quality and increases of transmission capacity in the whole system.

DISCLOSURE OF INVENTION

The present invention is carried out taking into account the problems described above and has an object to provide a method for generating spreading codes orthgonalizing, even in the case of different spreading factor, and having low time dependence, and a method for selecting spreading codes having smaller time dependence from the generated spreading codes.

The object is achieved by a code generating method for combining an orthogonal code of a specific spreading factor for CDMA and its polarity inverted orthogonal code to generate an orthogonal code having a larger spreading factor than that of the orthogonal code.

And, the object is achieved by a code selecting method comprising a step for combining an orthogonal code of a specific spreading factor for CDMA and its polarity inverted orthogonal code to generate an orthogonal code having a larger spreading factor than that of the orthogonal code and a step for assigning the generated orthogonal code for a user in using an orthogonal code having a smaller spreading factor.

BRIEF DESCRIPTION OF DRAWINGS

FIG. 2 illustrate examples of Walsh code of spreading factor 16;

FIG. 7(*a*) to FIG. 7(*b*-2) are diagrams illustrating a correlation method used in a code selection in the present invention.

BEST MODE FOR CARRYING OUT THE INVENTION

The present invention is explained in detail with reference to attached drawings in the following.

In the present invention, an orthogonal code having large spreading factor is generated by combining an orthogonal code of small spreading factor and its inverted pattern. That allows to generate orthogonal codes orthogonalizing between each others without decreasing the total transmission information capacity even in the case of using codes of different spreading factors.

And in the present invention, the time dependence value of the generated orthogonal codes are calculated to select an orthogonal code of low time dependence value. That allows to select an orthogonal code of low time dependence value to obtain a code having large resistance against delayed wave.

And, by assigning an orthogonal code having low time dependence value selected in the above method for a user using a spreading code having a lower spreading factor which is weak against a delayed wave, it makes possible to improve transmission quality and increase the transmission amount in the whole system.

Next, the embodiment of the present invention is explained.
(Embodiment 1)

In the embodiment 1, a method for generating spreading codes (orthogonal codes) orthogonalizing between each others even in the case of using codes of different factors in a CDMA system is explained.

Figure 1:
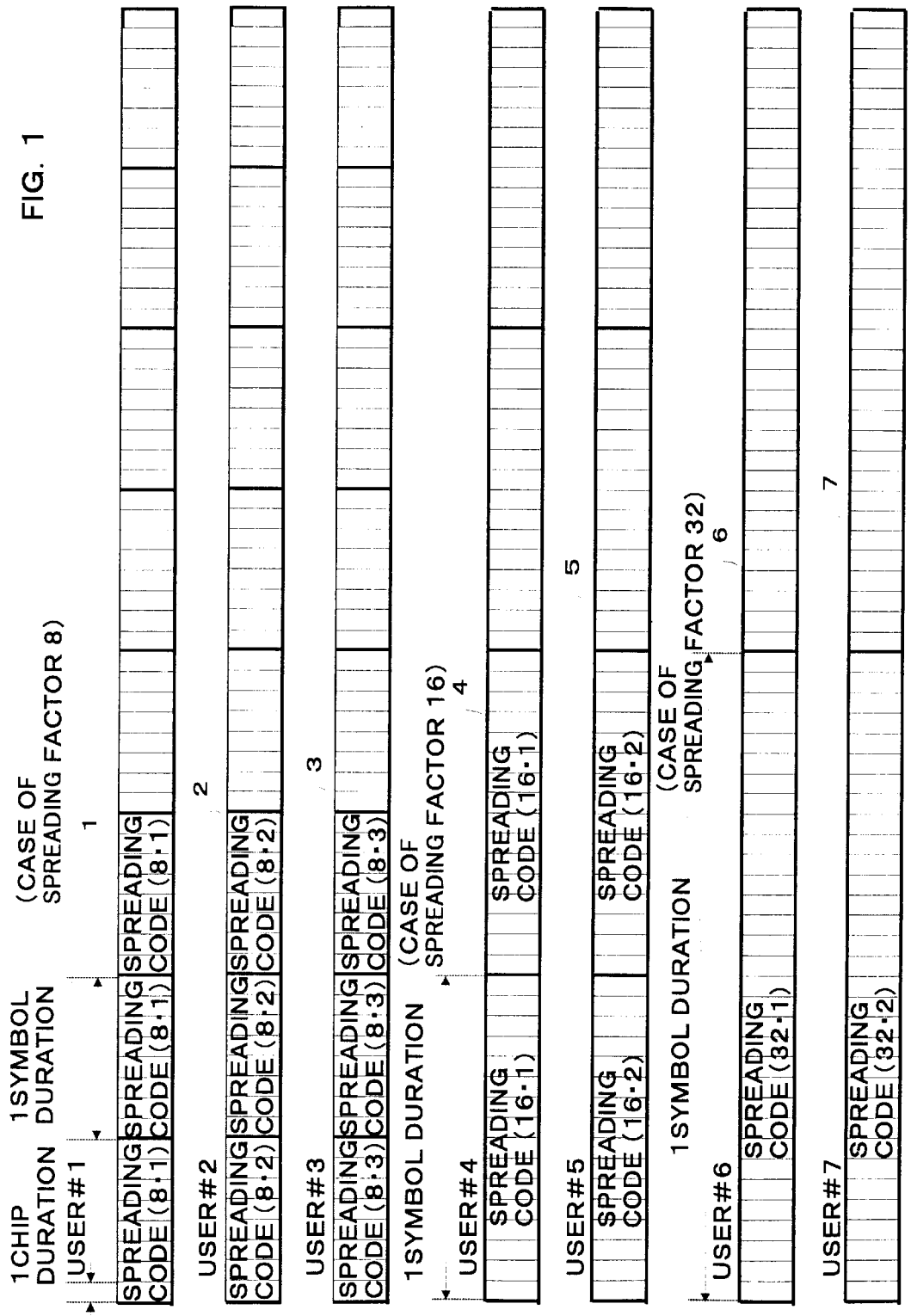
FIG. 1 is a diagram illustrating transmission signals in the case where users having a plurality of spreading codes of different spreading factors co-exist.
Figure 3:
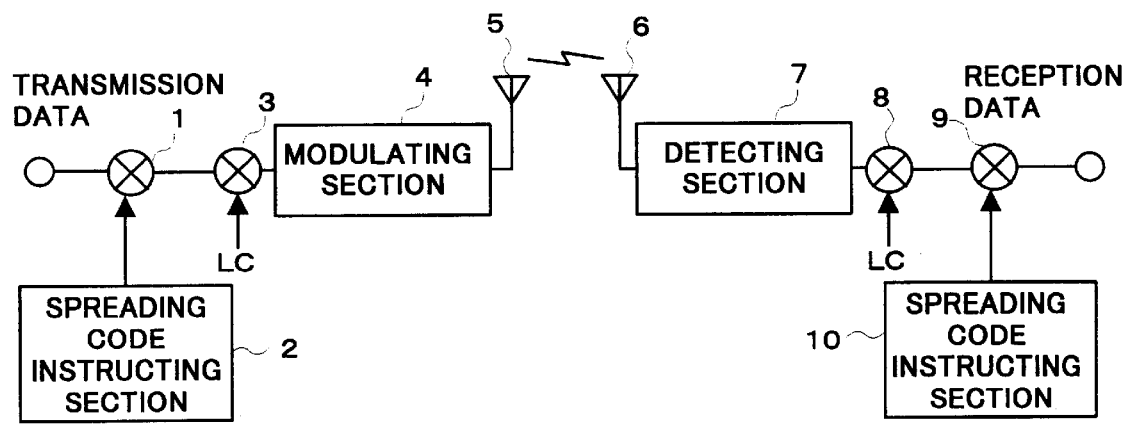
FIG. 3 is a block diagram illustrating a system executing a method of the present invention.

FIG. 3 is a schematic block diagram illustrating the CDMA used in implementing the code generating method and code selecting method of the present invention. In the system, a transmitting side comprises spreading section 1 for code spreading transmission data, spreading code instructing section 2 for obtaining a spreading code used in spreading the transmission data at spreading section 1, long code spreading section 3 for scrambling the spread data further with a long code, modulating section 4 for modulating the data spread with a long code and transmitting antenna 5 for transmitting the modulated signals.

And in the system, a receiving side comprises receiving antenna 6 for receiving transmitted signals, detecting section 7 for detecting received signals, long code despreading section 8 for releasing the scramble of the detected data with a long code, despreading section 9 for despreading the despread data further with a spreading code and spreading code instructing section 10 for providing a spreading code used in despreading into despreading section 9.

Figure 4:
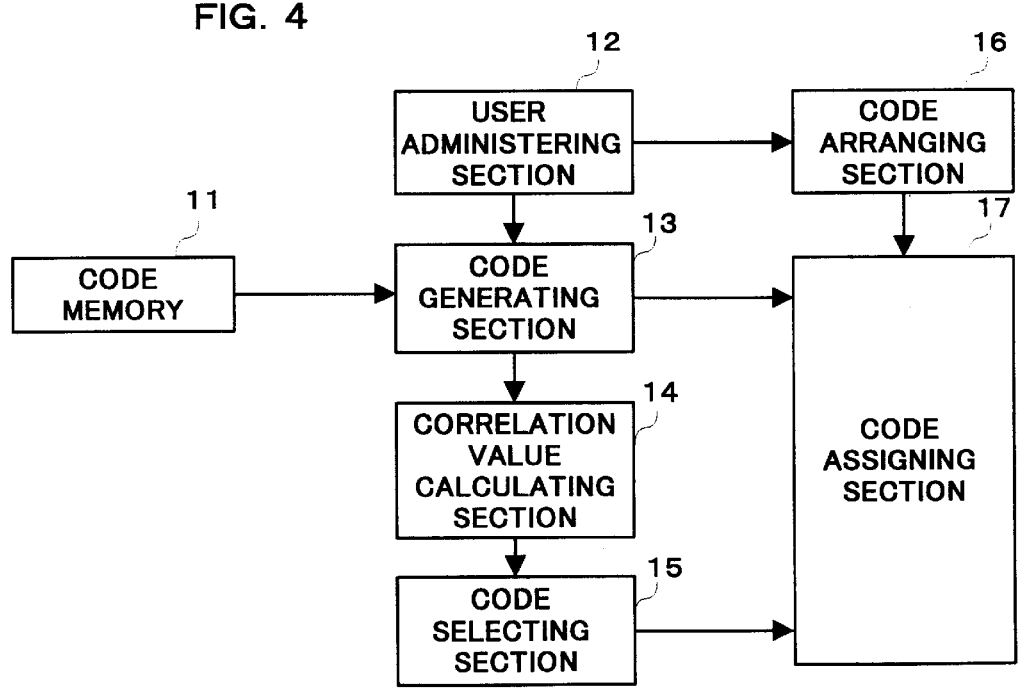
FIG. 4 is a block diagram illustrating spreading code instructing section at a base station in the system illustrated in FIG. 3.
Figure 5:
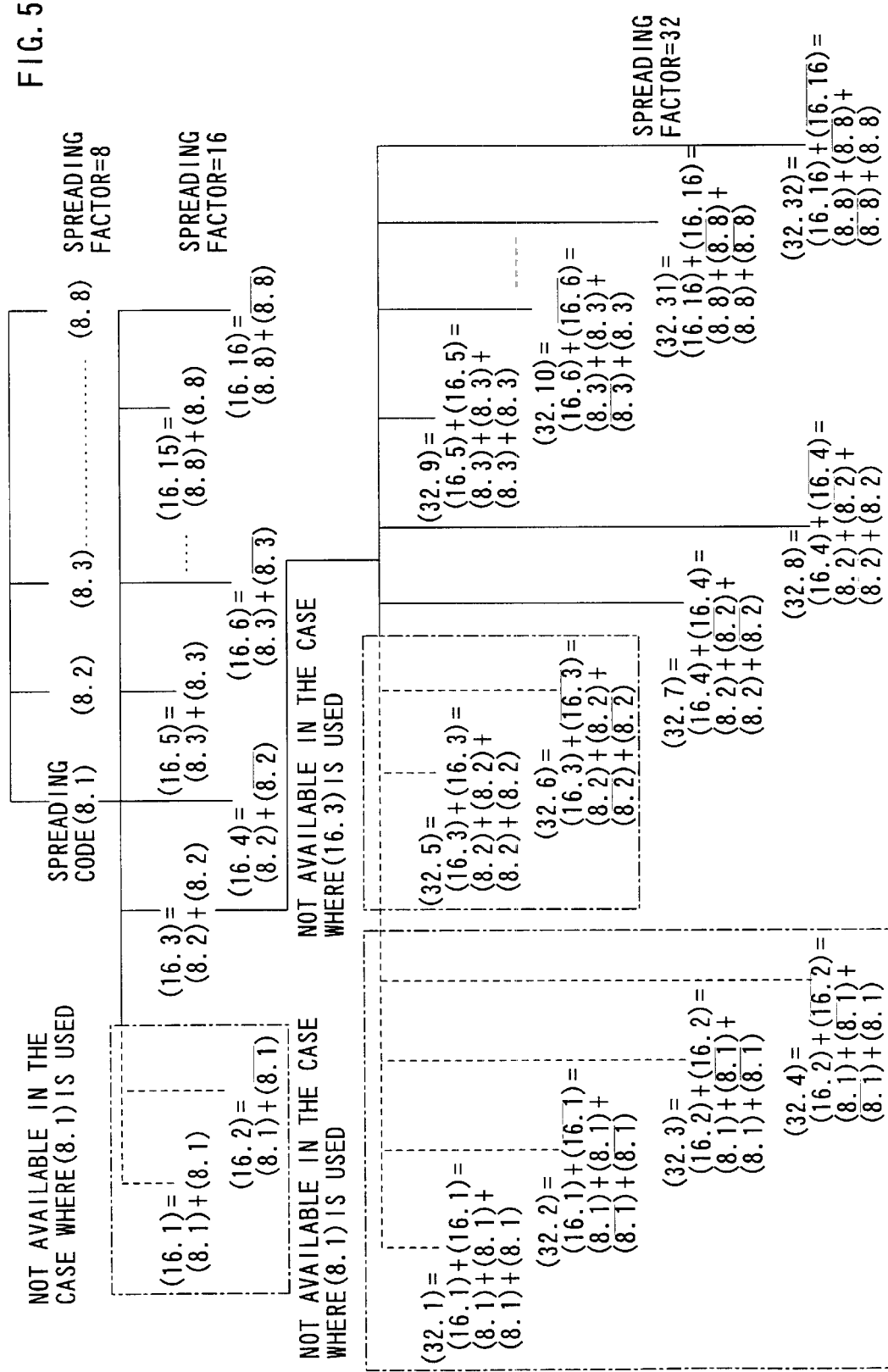
FIG. 5 is a diagram to explain a generating method of spreading codes in the present invention.

In communication between a base station and a mobile station, a spreading code instructing section at a base station comprises, as illustrated in FIG. 4, code memory 11 for storing a plurality of spreading codes, user administering section 12 for administering spreading codes used in communication with a base station separately for each user, code generating section 13 for combining spreading codes of small spreading factors to generate a spreading code of large spreading factor, correlation value calculating section 14 for executing auto-correlation of generated spreading codes taking into account time shifts to calculate auto-correlation values, code selecting section 15 for selecting on the basis of the correlation value, code arranging section 16 for changing a user used spreading code and arrange it, and code assigning section 17 for assigning a spreading code generated or selected for a user.

Next, operations in the CDMA system having the constitution described above are explained. First, transmission data is spread at spreading section 1 with a spreading code instructed by spreading code instructing section 2. Further, the spread transmission data is scrambled with a long code (LC) at long code spreading section 3. Then, the spread data in this way is provided into modulating section 4 to be modulated by modulation method such as BPSK (Binary Phase Shift Keying) and others. The modulated signals are radiated from transmitting antenna 5.

The transmitted signals are received at receiving antenna 6. The received signals are detected at detecting section 7, released scramble at long code despreading section 8 and further despread with a spreading code instructed by code instructing section 10 to obtain reception data.

Next, operations of spreading code instructing section 2 and 10 are explained. The case where spreading code instructing section 2 is at a base station and spreading code instructing section 10 is at a mobile station, is explained. And orthogonal code of spreading factor 8 would be used as a base orthogonal code. In the case of spreading factor 8, eight orthogonal codes orthogonalizing between each others exist, and these eight codes are referred as spreading code from (8.1) to (8.8).

These spreading codes from (8.1) to (8.8) are stored in code memory 11 at spreading code instructing section 2. And user administering section 12 administrates about which user uses which code. Code generating section 13 combines spreading codes from (8.1) to (8.8) stored in code memory 11 and their polarity inverted spreading codes to generate spreading code of larger spreading factor, for instance spreading factor 16 and 32. At this time, obtained spreading codes are referred to the using spreading codes in user administering section 12, then in the case where spreading codes in using are contained in the combination, those can not be used. The spreading codes generated in this way orthogonalize with all spreading codes of spreading factor 8.

A method to generate the spreading codes described above is as follows. A spreading code obtained by repeating spreading code (8.1) twice is referred to spreading code (16.1). A spreading code obtained by connecting spreading code (8.1) and its inverted spreading code (8.1) is referred to spreading code (16.2). These spreading codes (16.1) and (16.2) have the correlation with spreading code (8.1) and orthogonaloze with from (8.2) to (8.8). And the correlation value of the former 8 bits of spreading codes (16.1) and (16.2) is 1, and the correlation value of the latter 8 bits of them is −1. It brings that the correlation value of 16 bits of them is 0, which means they are orthogonalized. The above generating method allows to generate spreading codes (16.1) and (16.2). However, since spreading codes (16.1) and (16.2) are generated using spreading code (8.1), in the case where a user having a spreading code of spreading factor 8 uses (8.1), a user having a spreading code of spreading factor 16 can not use this spreading code.

In the same way as described above, spreading codes from (16.3) to (16.6) are generated using spreading codes from (8.2) to (8.8) and their polarity inverted spreading codes. And, spreading codes having spreading factor 32 are generated using spreading codes from (16.1) to (16.16) in the same way as described above. In this case, since spreading codes from (32.1) to (32.4) are generated using spreading code (8.1) of spreading factor 8, they can not be used in the case where a user having a spreading code of spreading factor 8 uses (8.1). On the other hand, spreading code instructing section 10 at a mobile station maintains a spreading code transmitted from a base station and outputs this spreading code to despreading section 9.

Next, a method for assigning spreading codes generated as described above for users is explained. Spreading codes generated at code generating section 13 are transmitted into code assigning section 17 to assign for users.

For instance, in the case where users from A to G uses spreading codes of spreading factor 8, 16, 16, 16, 32, 32, 32 respectively, code (8.1) is assigned for user A using a spreading code of the smallest spreading factor (8).

A spreading code of the second smallest spreading factor 16 is assigned for user B using. In this case, since user A already uses spreading code (8.1), a spreading code generated using spreading code (8.1) is not available as a spreading code for user B. Accordingly, spreading code (8.2)+(8.2) is available for user B. And for user C. spreading code (8.2)+(8.2) is available to assign.

For user D, since a spreading code generated from (8.1) and (8.2) is already used, spreading code (8.3)+($\overline{8.3}$) is assigned. For user E, since a spreading code generated from spreading code (8.3)+($\overline{8.3}$) is not available but spreading code (8.3)+(8.3)+($\overline{8.3}$)+($\overline{8.3}$) is available, it is assigned. Further, according to the limitation described above, spreading code (8.4)+(8.4)+(8.4)+(8.4) is assigned for user F and spreading code (8.3)+(8.3)+(8.3)+(8.3) is assigned for user G. As described above, in the case of assigning spreading codes for users, spreading codes are assigned for user in order of users having a spreading code of smaller spreading factor.

In the case where spreading codes used in spreading codes of large spreading factor are used irregularly, for instance, in the case where spreading codes (32.1), (32.5), (32.9), (32.13), (32.17), (32.21), (32.25) and (32.29) are used, these spreading codes are arranged to (32.1) to (32.8) that can be generated from spreading code (8.1). And the arranged spreading codes are assigned for users in order of users having a spreading code of smaller spreading factor described above. Namely, spreading codes are arranged at code arranging section 16 on the basis of information from user administering section 12. Next, code assigning section 17 assigns a spreading code for a user on the basis of information from code arranging section 16.

Figure 6:
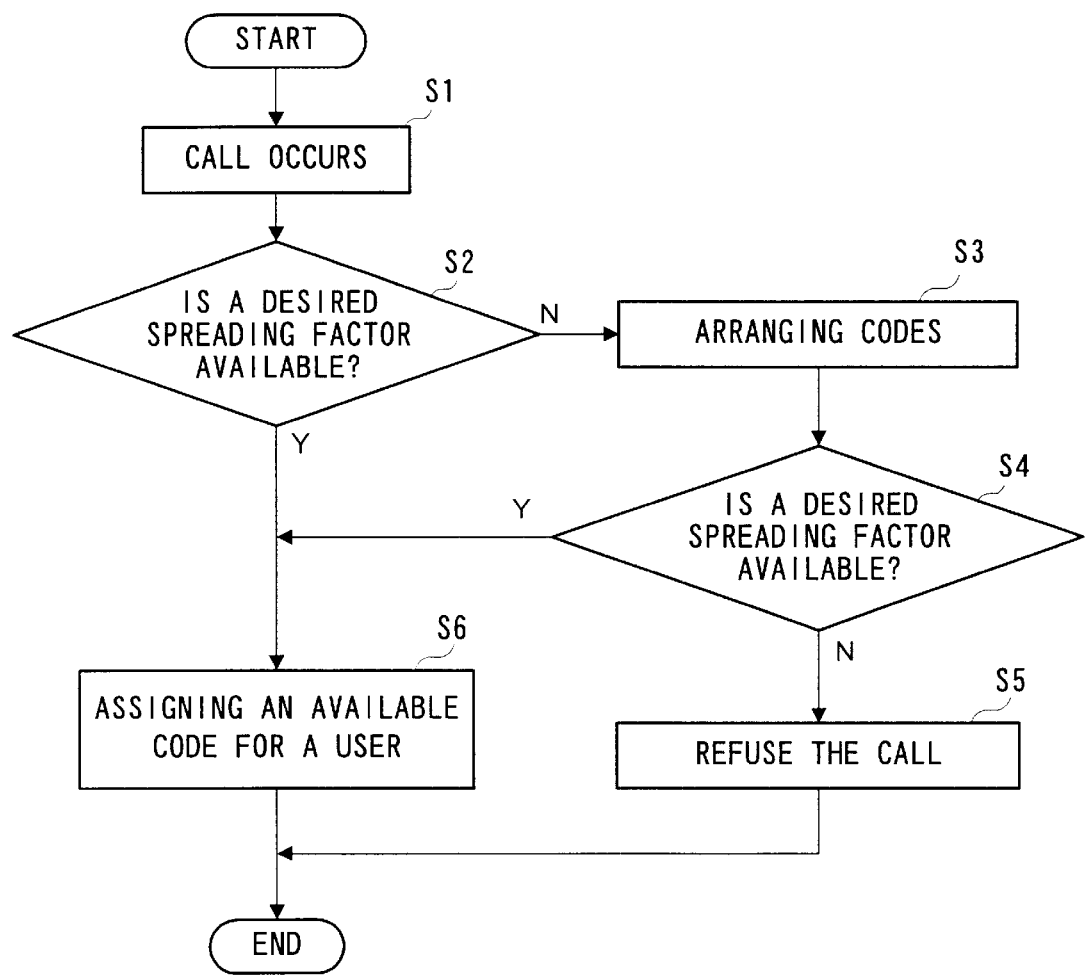
FIG. 6 is a flow chart for assigning a code in the present invention.

The assignment of the spreading codes are executed according to the flow chart illustrated in FIG. 6. First, when a call occurs (S1), it is examined whether a spreading code of desirable spreading factor is available, i.e. all of spreading codes of desirable spreading factor are not used (S2). When all of spreading codes of desirable spreading factor are used, codes are arranged at code arranging section 16 (S3). Further it is examined again whether a spreading codes of desirable spreading factor is available, i.e. all of spreading codes of desirable spreading factor are not used (S4). When all of spreading codes of desirable spreading factor are used, the call is refused (S5). On the other hand, without any relation to whether spreading codes are arranged or not, when a spreading code of desirable spreading factor is available, an available spreading code is assigned for a user (S6).

The time dependence of the code generated as described above and assigned for users is smaller then that of Walsh codes. And it is ensured to orthogonaloze between any spreading codes of spreading factor $2^n$. That allows to transmit information in any combination of user signals with spreading codes of different spreading factors within the total transmission information capacity.

(Embodiment 2)

In the embodiment 2, a method to select a spreading code having low time dependence from the spreading codes generated according to the method of embodiment 1 is explained. Accordingly, the generation method, to generate a spreading code having larger spreading factor by combining spreading codes having a specific spreading factor, is the same as that of embodiment 1.

In this way, a spreading code generated at code generating section 13 illustrated in FIG. 4 is transmitted into correlation value calculating section 14 to obtain the auto-correlation value, a spreading code is selected at code selecting section 15 on the basis of the correlation value, then the selected spreading code is assigned for a user at code assigning section 17.

Concretely, as illustrated in FIG.7, the auto-correlation value of a spreading code is calculated taking into account the time difference. For instance, in the case where the time difference τ is 0, auto correlation result 101 is obtained by calculating an accumulation of bits at the same position of a spreading code as illustrated in FIG. 7(a).

And, in the case of where the time difference τ is 2, the auto-correlation value is calculated by corresponding from the first bit to the eighth bit in a spreading code respectively to from the third bit to the second bit in the same spreading code shifted according to time difference 2. At this time, in the case where neighboring symbols in spread data are the same, the first bit and the second bit in a spreading code shifted according to time difference are respectively the same as the first bit and the second bit in the original spreading code (correlation result 102) as illustrated in FIG. 7(b-1). On the other hand, in the case where neighboring symbols in spread data are different, the first bit and the second bit in a spreading code shifted according to time difference are respectively the polarity inverted first bit and second bit in the original spreading code (correlation result 103) as illustrated in FIG. 7(b-2).

Since neighboring symbols are irregular, the auto correlation values of all patterns are calculated, taking into account as many as possible patterns, then the maximum value in an absolute value is refereed to the maximum correlation value of the code. In addition, in the embodiment, since a modulation method is supposed BPSK, the case of neighboring symbols are two, i.e. the case illustrated in FIG. 7(b-1) and the case illustrated in FIG. 7(b-2) are considered. In addition, in the case of applying other modulation method, the cases of neighboring symbols may be more than two.

As described above, the auto correlation is examined until time difference 1~(spreading factor−1). Next, a spreading code having the smallest maximum correlation value among all codes is assigned for a user in using a spreading code of the smallest spreading factor.

Because, in the case of a small spreading factor, since spreading gain is small, the effectiveness of cancellation for interference between code signals generated by delayed waves is small. To keep the transmission quality, the transmission power is increased in a conventional method. However, increases of the transmission power of a specific user results in increases of interference against other users and decreases in quality, in the whole system, which decreases the transmission capacity. To prevent such problem, in the present invention, a spreading code of small time dependence is primarily assigned for a user having a small spreading factor.

As described above, by calculating the time dependence of a spreading code generated and assigning a spreading code basis of the results, the quality of data transmission of a user, who uses spreading code of small spreading factor that is most affected by interference between code signals, is improved. That allows to decrease the transmission power of the user and interference against other users, which results in the improvement of the quality and the increases of transmission capacity in the whole system.

In the embodiments 1 and 2 described above, the case is explained that spreading codes of larger spreading factor are generated by combining spreading codes, and if some of the generated spreading codes are already used, they are not use.

However, in the present invention, it may be possible to pre-recognize already used spreading codes, exclude them and generate spreading codes of larger spreading factor using other spreading codes.

In the embodiments 1 and 2 described above, as a spreading code sequence, orthogonal Gold code sequence and other code sequence may be applied. And, in the embodiments 1 and 2 described above, the case is explained that BPSK is applied as a modulation method, however, the present invention is applied in other modulation methods.

And, in the embodiment 1 and 2 described above, the case is explained that a long code is applied for data, however, the present invention has the same effect in the case where a long code is not applied.

As described above, in the spreading code generating method of the present invention, it is possible to generate orthogonal codes of different spreading factors having small time dependence. The use of the generated spreading codes allows to multiple user signals of different spreading factors without decreases of the total transmission information capacity.

And, by applying the selecting method of spreading codes in the present invention, the deterioration in the quality caused by delayed waves are decreased, which allows to improve the quality and increase the transmission capacity in the whole system.

INDUSTRIAL APPLICABILITY

The code generating method and code selecting method in the present invention are useful in data communication field using radio communication devices such as portable telephone and others.

What is claimed is:

1. A method for generating spreading codes used in a CDMA communication, comprising:

preparing a plurality of first orthogonal codes, orthogonalized to each other, each having a specific spreading factor; and combining each first orthogonal code, of the plurality of first orthogonal codes, and its polarity inverted orthogonal code to generate a plurality of second orthogonal codes, orthogonalized to each other and to the first orthogonal codes, each second orthogonal code, of the plurality of second orthogonal codes, having a spreading factor larger than a specific spreading factor of an associated first orthogonal code.

2. The method of claim 1, wherein an unused first orthogonal code is combined with its polarity inverted orthogonal code to generate a certain second orthogonal code.

3. A method for selecting a spreading code used in a CDMA communication, comprising:

preparing a plurality of first orthogonal codes, orthogonalized to each other, each first orthogonal code, of the plurality of orthogonal codes, having a specific spreading factor;

combining each first orthogonal code and its polarity inverted orthogonal code to generate a plurality of second orthogonal codes, orthogonalized to each other and to the first orthogonal codes, each second orthogonal code, of the plurality of second orthogonal codes, having a spreading factor larger than a specific spreading factor of an associated first orthogonal code; and assigning the first orthogonal codes and the second orthogonal codes to users in an order in which an orthogonal code of a predetermined spreading factor is assigned to a user using an orthogonal code of the predetermined spreading factor.

4. The method of claim 3, wherein said orthogonal code of a predetermined spreading factor comprises an orthogonal code having a minimal spreading factor.

5. The method of claim 3, further comprising:

examining whether an orthogonal code of a spreading factor desired by a user to be assigned an orthogonal code is available; and arranging the first plurality of orthogonal codes and the second plurality of orthogonal codes when the desired orthogonal spreading factor is not available.

6. A method for selecting a spreading code used in a CDMA communication, comprising:

preparing a plurality of first orthogonal codes, orthogonalized to each other, each first orthogonal code, of the plurality of first orthogonal codes, having a specific spreading factor;

combining each first orthogonal code and its polarity inverted orthogonal code to generate a plurality of second orthogonal codes, orthogonalized to each other and to the first orthogonal codes, each second orthogonal code, of the plurality of second orthogonal codes, having a spreading factor larger than a specific spreading factor of an associated first orthogonal code;

calculating a time dependence value in correlation of each first orthogonal code and each second orthogonal code; and selecting an orthogonal code having a predetermined calculated time dependence value in correlation.

7. The method of claim 6, further comprising:

assigning the plurality of first orthogonal codes and the plurality of second orthogonal codes in a predetermined order in which an orthogonal code having a spreading factor that is smaller than a spreading factor of a respective orthogonal code is assigned to a user.

8. A base station apparatus used in a CDMA communication, comprising:

a code generator that generates a plurality of first orthogonal codes, orthogonalized to each other, each first orthogonal code, of said plurality of first orthogonal codes, having a specific spreading factor, said code generator combining each first orthogonal code and its polarity inverted orthogonal code to generate a plurality of second orthogonal codes, orthogonalized to each other and to said plurality of first orthogonal codes, each second orthogonal code, of said plurality of second orthogonal codes, having a spreading factor that is larger than a specific spreading factor of an associated first orthogonal code; and a spreader that spreads data using said plurality of first orthogonal codes and said plurality of second orthogonal codes.

9. The apparatus of claim 8, further comprising:

an administer that administers said plurality of first orthogonal codes and said plurality of second orthogonal codes used by users communicating with said base station apparatus.

10. The apparatus of claim 8, further comprising:

an assigner that assigns said plurality of first orthogonal codes and said plurality of second orthogonal codes to users in an order in which an orthogonal code having a spreading factor that is smaller than a spreading factor of a respective orthogonal code is assigned to a user.

11. The apparatus of claim 8, further comprising:

a correlation value calculator that calculates a time dependence value in correlation of each of said plurality of first orthogonal codes and said plurality of second orthogonal codes.

12. The apparatus of claim 11, further comprising:

an assigner that assigns said plurality of first orthogonal codes and said plurality of second orthogonal codes to users in an order in which an orthogonal code with a time dependence value smaller in correlation to another orthogonal code is assigned to a user.

13. The apparatus of claim 8, wherein a mobile station apparatus performs a CDMA wireless communication with said base station apparatus.

14. A communication system, comprising:

a base station apparatus used in a CDMA communication, comprising:

a code generator that generates a plurality of first orthogonal codes, orthogonalized to each other, each first orthogonal code, of said plurality of first orthogonal codes, having a specific spreading factor, said code generator combining each first orthogonal code and its polarity inverted orthogonal code to generate a plurality of second orthogonal codes, orthogonalized to each other and to said plurality of first orthogonal codes, each second orthogonal code, of said plurality of second orthogonal codes, having a spreading factor that is larger than a specific spreading factor of an associated first orthogonal code; and a spreader that spreads data using said plurality of first orthogonal codes and said plurality of second orthogonal codes; and a mobile station apparatus that performs a CDMA wireless communication with said base station apparatus.

* * * * *